(12) United States Patent
Ernst et al.

(10) Patent No.: US 12,078,399 B2
(45) Date of Patent: Sep. 3, 2024

(54) REGENERATION USING LIQUID LOOP OF ENVIRONMENTAL CONTROL SYSTEM

(71) Applicant: Hamilton Sundstrand Corporation, Charlotte, NC (US)

(72) Inventors: Jeffrey Ernst, Wethersfield, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/903,559

(22) Filed: Sep. 6, 2022

(65) Prior Publication Data

US 2024/0077234 A1 Mar. 7, 2024

(51) Int. Cl.
| | |
|---|---|
| *F25B 9/00* | (2006.01) |
| *B64D 13/06* | (2006.01) |
| *B64D 13/08* | (2006.01) |
| *F25B 9/06* | (2006.01) |

(52) U.S. Cl.
CPC .............. *F25B 9/004* (2013.01); *B64D 13/08* (2013.01); *F25B 9/06* (2013.01); *B64D 2013/0648* (2013.01)

(58) Field of Classification Search
CPC . F25B 9/004; F25B 9/06; B64D 13/08; B64D 2013/0648
USPC .......................................................... 62/87
See application file for complete search history.

(56) References Cited

U.S. PATENT DOCUMENTS

| | | | | |
|---|---|---|---|---|
| 4,430,867 | A * | 2/1984 | Warner ................. | B64D 13/06 62/402 |
| 6,457,318 | B1 | 10/2002 | Lui et al. | |
| 6,615,606 | B2 * | 9/2003 | Zywiak ................. | B64D 13/06 62/402 |
| 10,507,928 | B2 | 12/2019 | Marr et al. | |
| 2003/0126880 | A1 | 7/2003 | Zywiak | |
| 2018/0305030 | A1 | 10/2018 | Galzin | |

OTHER PUBLICATIONS

Extended European Search Report for European Application No. 23195824.0; Report Mail Date Jan. 29, 2024 (9 Pages).

* cited by examiner

*Primary Examiner* — Steve S Tanenbaum
(74) *Attorney, Agent, or Firm* — CANTOR COLBURN LLP

(57) ABSTRACT

An environmental control system includes an inlet configured to receive a medium and a compressing device fluidly connected to the inlet. The compressing device includes a compressor operably coupled to a turbine. An outlet of the compressor is fluidly connected to an inlet of the turbine such that the medium is provided to the compressor and the turbine in series. At least one air-liquid heat exchanger is arranged in fluid communication with the outlet of the compressor and the inlet of the turbine. The at least one air-liquid heat exchanger is also connected to a liquid loop containing a liquid. At least one air-liquid regeneration heat exchanger is fluidly connected to the liquid loop at a location upstream from the at least one air-liquid heat exchanger.

10 Claims, 4 Drawing Sheets

REGENERATION USING LIQUID LOOP OF ENVIRONMENTAL CONTROL SYSTEM

BACKGROUND

Exemplary embodiments of the present disclosure relate to the art of environmental control systems, and more particularly to an environmental control system in which an air cycle machine is in a heat exchange relationship with one or more liquid cycle subsystems.

Environmental control systems provide a supply of conditioned air to an enclosure of an aircraft, such as an aircraft cabin and cockpit. Conventional environmental control systems utilize an air cycle cooling system which is in a heat exchange relationship with a liquid loop. The liquid loop is typically used to cool other loads within the aircraft, such as avionics packages or the like. Interaction between the air and liquid subsystems may be relatively complex.

In a conventional system, a flow of bleed air is taken from a bleed source, for example, an intermediate or high-pressure stage of a gas turbine engine compressor. The bleed air is provided to a heat exchanger where the temperature is reduced before entering a compressor of an air-cycle machine (ACM). After compression, the air flows to another heat exchanger to reduce the temperature thereof. The cooled air is then routed to a turbine of the ACM where the air expands causing a reduction in the pressure and temperature of the air. The air output from the turbine will then pass through a condenser heat exchanger to remove moisture from the air. The extracted moisture is typically collected in a water collector and the dry air is routed to a cabin, or may be provided to a mixer before being sent to a cabin. Such existing systems includes several components fluidly connected to one another by ducts or conduits.

BRIEF DESCRIPTION

According to an embodiment, an environmental control system includes an inlet configured to receive a medium and a compressing device fluidly connected to the inlet. The compressing device includes a compressor operably coupled to a turbine. An outlet of the compressor is fluidly connected to an inlet of the turbine such that the medium is provided to the compressor and the turbine in series. At least one air-liquid heat exchanger is arranged in fluid communication with the outlet of the compressor and the inlet of the turbine. The at least one air-liquid heat exchanger is also connected to a liquid loop containing a liquid. At least one air-liquid regeneration heat exchanger is fluidly connected to the liquid loop at a location upstream from the at least one air-liquid heat exchanger.

In addition to one or more of the features described above, or as an alternative, in further embodiments the liquid of the liquid loop has a temperature between about 80° F. and about 130° F. at an inlet of the at least one air-liquid heat exchanger.

In addition to one or more of the features described above, or as an alternative, in further embodiments the at least one air-liquid regeneration heat exchanger further comprises a first air-liquid regeneration heat exchanger and a second air-liquid regeneration heat exchanger, the second air-liquid regeneration heat exchanger being arranged downstream from the at least one air-liquid heat exchanger relative to a flow of the liquid.

In addition to one or more of the features described above, or as an alternative, in further embodiments comprising an air-air regeneration heat exchanger, the air-air regeneration heat exchanger being positioned upstream from and fluidly coupled to the at least one air-liquid heat exchanger relative to a flow of the medium.

In addition to one or more of the features described above, or as an alternative, in further embodiments the air-air regeneration heat exchanger is arranged downstream from and in fluid communication with an outlet of the at least one air-liquid regeneration heat exchanger relative to a flow of another medium.

In addition to one or more of the features described above, or as an alternative, in further embodiments the flow of another medium is configured as a heat sink to cool the medium at a location downstream from the outlet of the compressor and upstream from the inlet of the turbine.

In addition to one or more of the features described above, or as an alternative, in further embodiments comprising an outlet, wherein a conditioned form of the medium is provided to the outlet and a portion of the conditioned form of the medium is used as the flow of another medium.

In addition to one or more of the features described above, or as an alternative, in further embodiments the portion of the conditioned form of the medium has a temperature between 0° F. and 35° F. at the at least one air-liquid regeneration heat exchanger.

In addition to one or more of the features described above, or as an alternative, in further embodiments the portion of the conditioned form of the medium has a temperature equal to or greater than 125° F. at the at least one air-air regeneration heat exchanger.

In addition to one or more of the features described above, or as an alternative, in further embodiments comprising another air-liquid heat exchanger arranged downstream from and in fluid communication with an outlet of the turbine. Another liquid from another liquid loop is arranged at in a heat transfer relationship with the medium at the second air-liquid heat exchanger.

According to an embodiment, an environmental control system includes an inlet configured to receive a medium and a compressing device fluidly connected to the inlet. The compressing device includes a compressor operably coupled to a turbine. An outlet of the compressor is fluidly connected to an inlet of the turbine such that the medium is provided to the compressor and the turbine in series. A first air-liquid heat exchanger is arranged in fluid communication with the outlet of the compressor. The first air-liquid heat exchanger is connected to a first liquid loop containing a first liquid. A second air-liquid heat exchanger is arranged in fluid communication with an outlet of the first air-liquid heat exchanger and the inlet of the turbine of the compressing device. The second air-liquid heat exchanger is fluidly connected to a second liquid loop and containing a second liquid.

In addition to one or more of the features described above, or as an alternative, in further embodiments the second liquid loop is distinct from the first liquid loop.

In addition to one or more of the features described above, or as an alternative, in further embodiments comprising an air-liquid regeneration heat exchanger fluidly connected the second liquid loop at a location downstream from the at least one air-liquid heat exchanger.

In addition to one or more of the features described above, or as an alternative, in further embodiments comprising an air-air regeneration heat exchanger, the air-air regeneration heat exchanger being positioned upstream from and fluidly coupled to the first air-liquid heat exchanger relative to a flow of the medium.

In addition to one or more of the features described above, or as an alternative, in further embodiments the air-air regeneration heat exchanger is arranged downstream from and in fluid communication with an outlet of the air-liquid regeneration heat exchanger relative to a flow of another medium.

In addition to one or more of the features described above, or as an alternative, in further embodiments the flow of another medium is configured as a heat sink to cool the medium at a location downstream from the outlet of the compressor and upstream from the inlet of the turbine.

In addition to one or more of the features described above, or as an alternative, in further embodiments comprising an outlet, wherein a conditioned form of the medium is provided to the outlet and a portion of the conditioned form of the medium is used as the flow of another medium.

In addition to one or more of the features described above, or as an alternative, in further embodiments the portion of the conditioned form of the medium has a temperature between 0° F. and 35° F. at the air-liquid regeneration heat exchanger.

According to an embodiment, a method of operating an environmental control system includes compressing a medium to form a compressed medium, cooling the compressed medium at a first air-liquid heat exchanger using a liquid from a liquid loop, and cooling the liquid of the liquid loop at a first air-liquid regeneration heat exchanger. The first air liquid regeneration heat exchanger is arranged upstream from and in fluid communication with an inlet of the first air-liquid heat exchanger.

In addition to one or more of the features described above, or as an alternative, in further embodiments cooling the compressed medium at the first air-liquid heat exchanger occurs prior to cooling the compressed medium at the second air-liquid heat exchanger.

In addition to one or more of the features described above, or as an alternative, in further embodiments comprising cooling the compressed medium at an air-air regeneration heat exchanger.

In addition to one or more of the features described above, or as an alternative, in further embodiments cooling the compressed medium at the air-air regeneration heat exchanger occurs prior to cooling the compressed medium at the first air-liquid heat exchanger.

In addition to one or more of the features described above, or as an alternative, in further embodiments comprising heating the compressed medium at a second air-liquid heat exchanger using another liquid from another liquid loop.

In addition to one or more of the features described above, or as an alternative, in further embodiments heating the compressed medium at the second air-liquid heat exchanger occurs after cooling the compressed medium at the first air-liquid heat exchanger.

According to an embodiment, a method of operating an environmental control system includes compressing a medium to form a compressed medium, cooling the compressed medium at a first air-liquid heat exchanger, and cooling the compressed medium at a second air-liquid heat exchanger. The first air-liquid heat exchanger is connected to a first liquid loop containing a first liquid and the second air-liquid heat exchanger is connected to a second liquid loop containing a second liquid.

In addition to one or more of the features described above, or as an alternative, in further embodiments cooling the compressed medium at the first air-liquid heat exchanger occurs prior to cooling the compressed medium at the second air-liquid heat exchanger.

In addition to one or more of the features described above, or as an alternative, in further embodiments comprising cooling the compressed medium at an air-air regeneration heat exchanger.

In addition to one or more of the features described above, or as an alternative, in further embodiments cooling the compressed medium at the air-air regeneration heat exchanger occurs prior to cooling the compressed medium at the first air-liquid heat exchanger.

In addition to one or more of the features described above, or as an alternative, in further embodiments comprising heating the compressed medium at a third air-liquid heat exchanger using the second liquid.

In addition to one or more of the features described above, or as an alternative, in further embodiments heating the compressed medium at the third air-liquid heat exchanger occurs after cooling the compressed medium at the second air-liquid heat exchanger.

In addition to one or more of the features described above, or as an alternative, in further embodiments comprising expanding the compressed medium within a turbine, wherein expanding the compressed medium occurs prior to heating the compressed medium at the third air-liquid heat exchanger.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
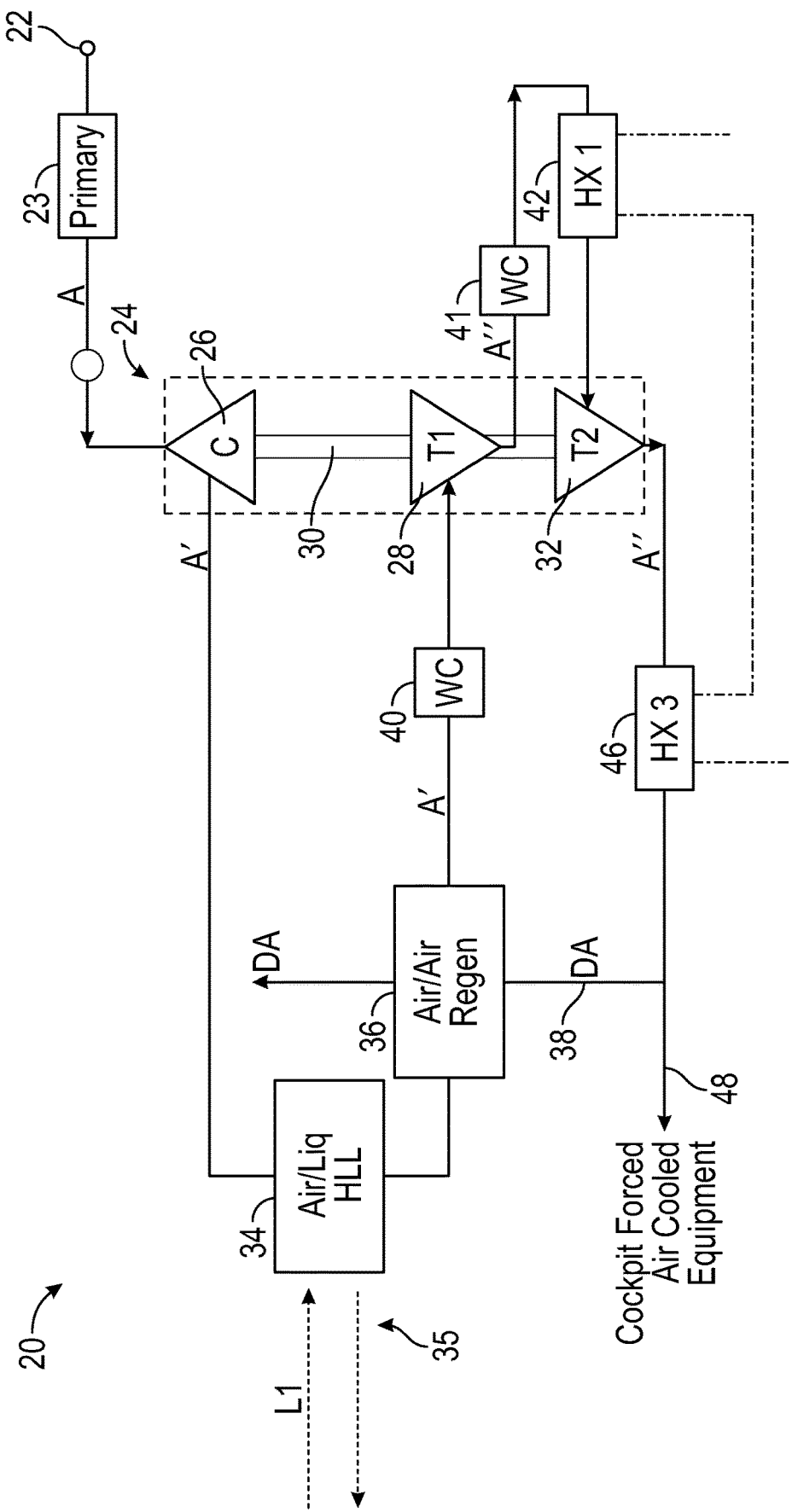
FIG. 1 is a schematic diagram of a portion of an environmental control system of an aircraft according to an embodiment.

With reference now to FIG. 1, a schematic diagram of a portion of an existing environmental control system (ECS), such as an air conditioning unit or pack for example, is depicted according to non-limiting embodiments as illustrated. Although the environmental control system 20 is described with reference to an aircraft, alternative applications, such as another vehicle for example, are also within the scope of the disclosure. As shown in the figure, the ECS 20 can receive a medium A at an inlet 22. In an embodiment where the environmental control system 20 is used in an aircraft application, the medium A may be bleed air, which is pressurized air originating from, i.e., being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

In another embodiment, the medium A provided to the inlet 22 is fresh air, such as outside air for example. The outside air can be procured via one or more scooping mechanisms, such as an impact scoop or a flush scoop for example. In an embodiment, the medium A is ram air drawn from a portion of a ram air circuit. Generally, the fresh or outside air as described herein is at an ambient pressure equal to an air pressure outside of the aircraft when the aircraft is on the ground and is between an ambient pressure and a cabin pressure when the aircraft is in flight. However, it should be appreciated that another type of medium A, such as from another source for example, may be provided to the inlet 22.

The ECS 20 additionally includes at least one compressing device 24. The compressing device 24 is a mechanical device that includes components for performing thermodynamic work on a medium (e.g., extracts work from or applies work to the medium A by raising and/or lowering pressure and by raising and/or lowering temperature). Examples of a compressing device 24 include an air cycle machine, a two-wheel air cycle machine, a three-wheel air cycle machine, a four-wheel air cycle machine, etc. As shown, the compressing device 24, also referred to herein as an air cycle machine, may include a compressor 26 and at least one turbine 28 operably coupled by a shaft 30. In an embodiment, the compressing device 24 includes two turbines 28, 32. In such embodiments, the medium A may be configured to flow through the turbines 28, 32 in series, or alternatively, in parallel.

A compressor 26 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 28 and 32 for example, is a mechanical device that expands a medium and extracts work therefrom (also referred to as extracting energy) to drive the compressor 26 via the shaft 30.

As shown, the medium A provided at the inlet 22 may be cooled within a primary heat exchanger 23 before being delivered to the compressing device 24. The flow (not shown) used as a heat sink to cool the medium A at the primary heat exchanger 23 can be ram air, engine fan air, or fuel. In the illustrated, non-limiting embodiment, the cooled medium A is provided to an inlet of the compressor 26. The act of compressing the medium A heats and increases the pressure of the medium A.

An inlet of a first heat exchanger 34, such as an air-liquid heat exchanger, is fluidly connected to the outlet of the compressor 26. The compressed medium A' may be cooled within the first air-liquid heat exchanger 34. In an embodiment, the first liquid L1 used to cool the compressed medium A' within the first air-liquid heat exchanger 34 is provided from a first liquid loop 35 used to condition, for example cool, one or more loads of the vehicle.

From the first air-liquid heat exchanger 34, the cooled compressed medium A' is provided to a first inlet of a regeneration heat exchanger 36. The regeneration heat exchanger 36 may be an air-air heat exchanger configured to utilize excess cooling capacity of the ECS 20 to further cool the compressed medium A'. For example, as will be described in more detail below, part of a conditioned form of the medium ready to be delivered to one or more loads of the vehicle, such as the cockpit for example, may be diverted along a regeneration pathway 38 to a second inlet of the air-air regeneration heat exchanger 36. At the air-air regeneration heat exchanger 36, the compressed medium A' is cooled via thermal exchange with this diverted medium DA. The heated diverted medium DA may then be exhausted overboard or provided to another component of subsystem of the aircraft.

The further cooled compressed medium A' output from a first outlet of the air-air regeneration heat exchanger 36, may have water removed therefrom via a water collector 40, before being provided to an inlet of the turbine 28. Within the turbine 28, energy is extracted from the compressed medium A' to form an expanded medium A". The work extracted from the compressed medium A' in the turbine 28 may be used to drive the compressor 26. The pressure of the expanded medium A" downstream of the first turbine 28 is at a middle pressure, a pressure lower than upstream from the first turbine 28 but higher than the pressure of the medium A at the air cycle machine outlet (outlet of turbine 32). In an embodiment, the expanded medium A" is provided to a middle-pressure water separator 41 configured to remove moisture therefrom. The temperature of the expanded medium A" output from the turbine 28 may be above freezing to facilitate the water removal. In an embodiment, the temperature of the expanded medium A" at and downstream from the outlet of the turbine 28 is maintained above freezing when the aircraft is at lower altitudes where water may be present.

In the illustrated, non-limiting embodiment, the expanded medium A" output from the turbine 28 is provided to a second heat exchanger 42, which may also be an air-liquid heat exchanger. At the second air-liquid heat exchanger 42, the expanded medium A" is arranged in a heat transfer relationship with another liquid L2 provided from another liquid loop 44, such as used to cool one or more loads of the vehicle. Although the second liquid loop 44 is illustrated and described herein as being distinct from the first liquid loop 35 associated with the first air-liquid heat exchanger 34, it should be understood that the same liquid from the same liquid loop may be used to condition the medium A at both heat exchangers 34, 42. In such embodiments, the second air-liquid heat exchanger 42 is arranged downstream from the first air-liquid heat exchanger 34 relative to both the flow of the medium A and the flow of the liquid.

Regardless of the source of the liquid, within the second air-liquid heat exchanger 42, thermal energy is transferred between the expanded medium A" and the second liquid L2. In an embodiment, the expanded medium A" is heated by the second liquid L2 and the resulting cooler liquid L2 may then directed to one or more heat loads of the second liquid loop 44. Because heat is transferred from the medium A to the first liquid L1 of the first liquid loop 35 at the first air-liquid heat exchanger 34, and heat is transferred from the second liquid L2 of the second liquid loop 44 to the expanded medium A" at the second air-liquid heat exchanger 42, the first liquid loop 35 may be considered a hot or heating liquid loop and the second liquid loop 44 may be considered a cold or cooling liquid loop.

From the second air-liquid heat exchanger 42, the expanded medium A" may be provided to an inlet of the second turbine 32. The energy extracted from the expanded medium A" within the second turbine 32 may also be used to drive the compressor 26. The resulting expanded medium A" output from the second turbine 32 is cooler and has a lower pressure than the expanded medium A" provided at the inlet thereof.

From the second turbine 32, the expanded medium A" is provided to a third heat exchanger 46. The third heat exchanger 46 may be configured as an air-liquid heat exchanger with the liquid being the same liquid L used in at least one of the first and second air-liquid heat exchangers 34, 42. In the illustrated, non-limiting embodiment, the third air-liquid heat exchanger 46 is arranged downstream from the second air-liquid heat exchanger 42 relative to the flow of both the medium A and the second liquid L2 of second liquid loop 44. However, embodiments where the liquid provided to the third air-liquid heat exchanger 46 is different than that provided to both the first air-liquid heat exchanger 34 and the second air-liquid heat exchanger 42 are also contemplated herein.

Within the third air-liquid heat exchanger 46, thermal energy is transferred between the expanded medium A" and the second liquid L2. In an embodiment, the expanded medium A" is heated by the second liquid L2, and the resulting cooler liquid L2 is then directed to one or more liquid cooled heat loads. In an embodiment, the second liquid L2 output from the third heat exchanger 46 has a temperature of about 59° F. The expanded medium A" at the outlet of the third heat exchanger 46 may be controlled between 0° F. and 35° F. depending on the altitude of the aircraft. The conditioned, expanded medium A" leaving the third air-liquid heat exchanger 46 may be provided to one or more loads, illustrated schematically at 48. These loads include, but are not limited to three potential destinations: the cockpit, the forced air-cooled equipment, or the air-air regeneration heat exchanger 36 (as the diverted medium DA) previously described herein. It should be understood that the environmental control system 20 illustrated and described herein is intended as an example only, and that an ECS having another suitable flow configuration for conditioning one or more mediums is within the scope of the disclosure.

Figure 2:
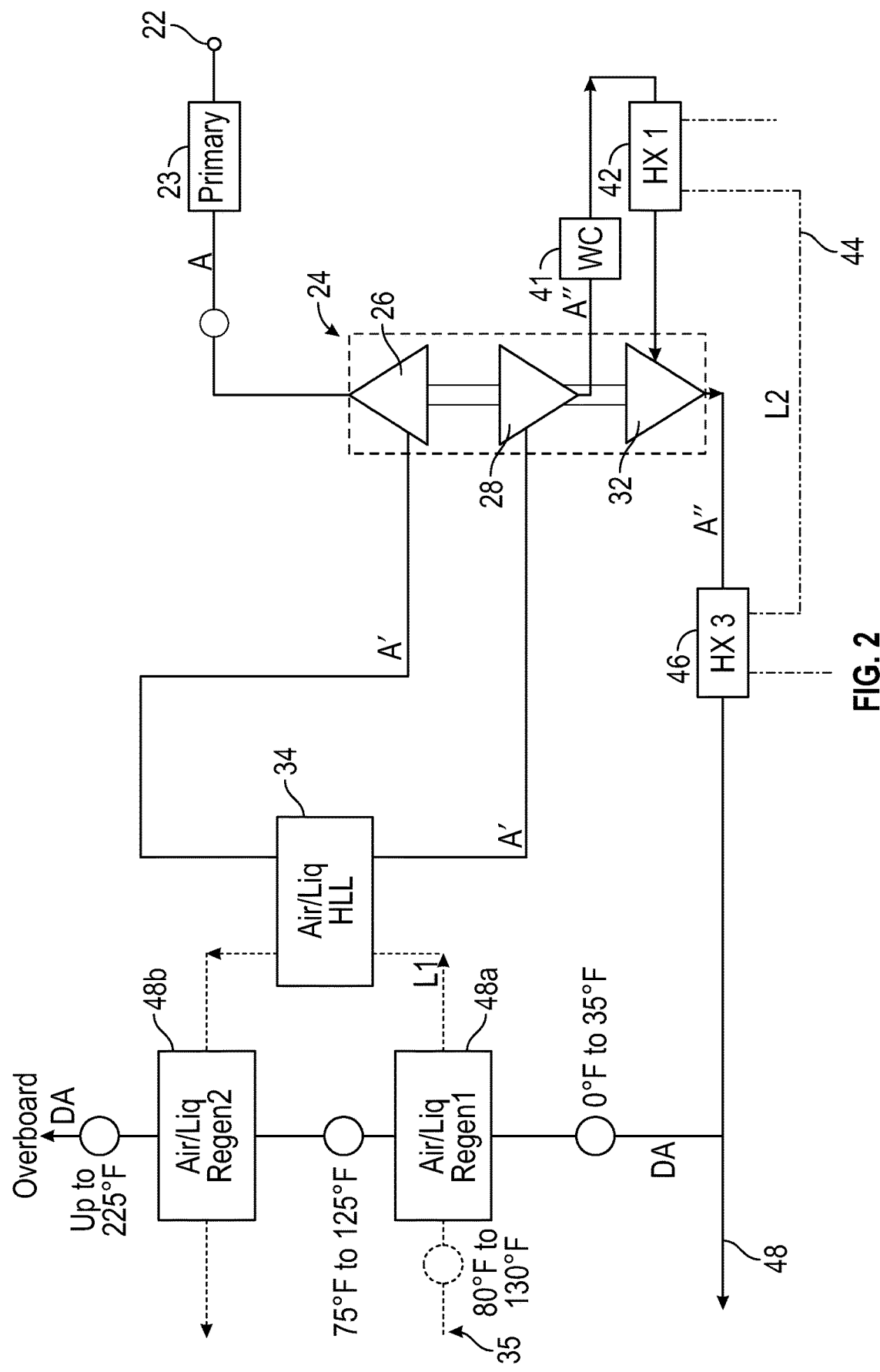
FIG. 2 is a schematic diagram of a portion of an environmental control system of an aircraft according to another embodiment.
Figure 3:
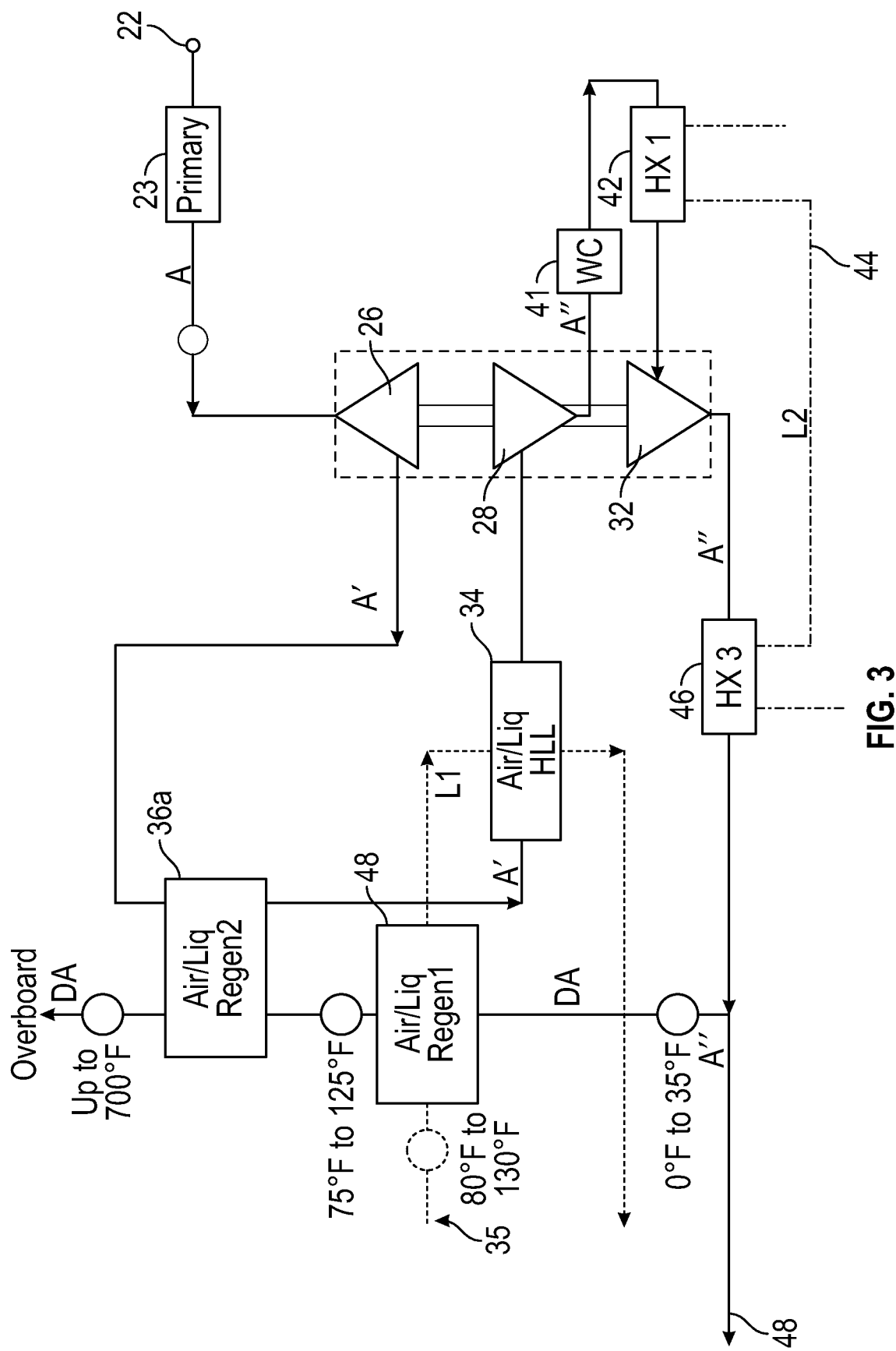
FIG. 3 is a schematic diagram of a portion of an environmental control system of an aircraft according to another embodiment.
Figure 4:
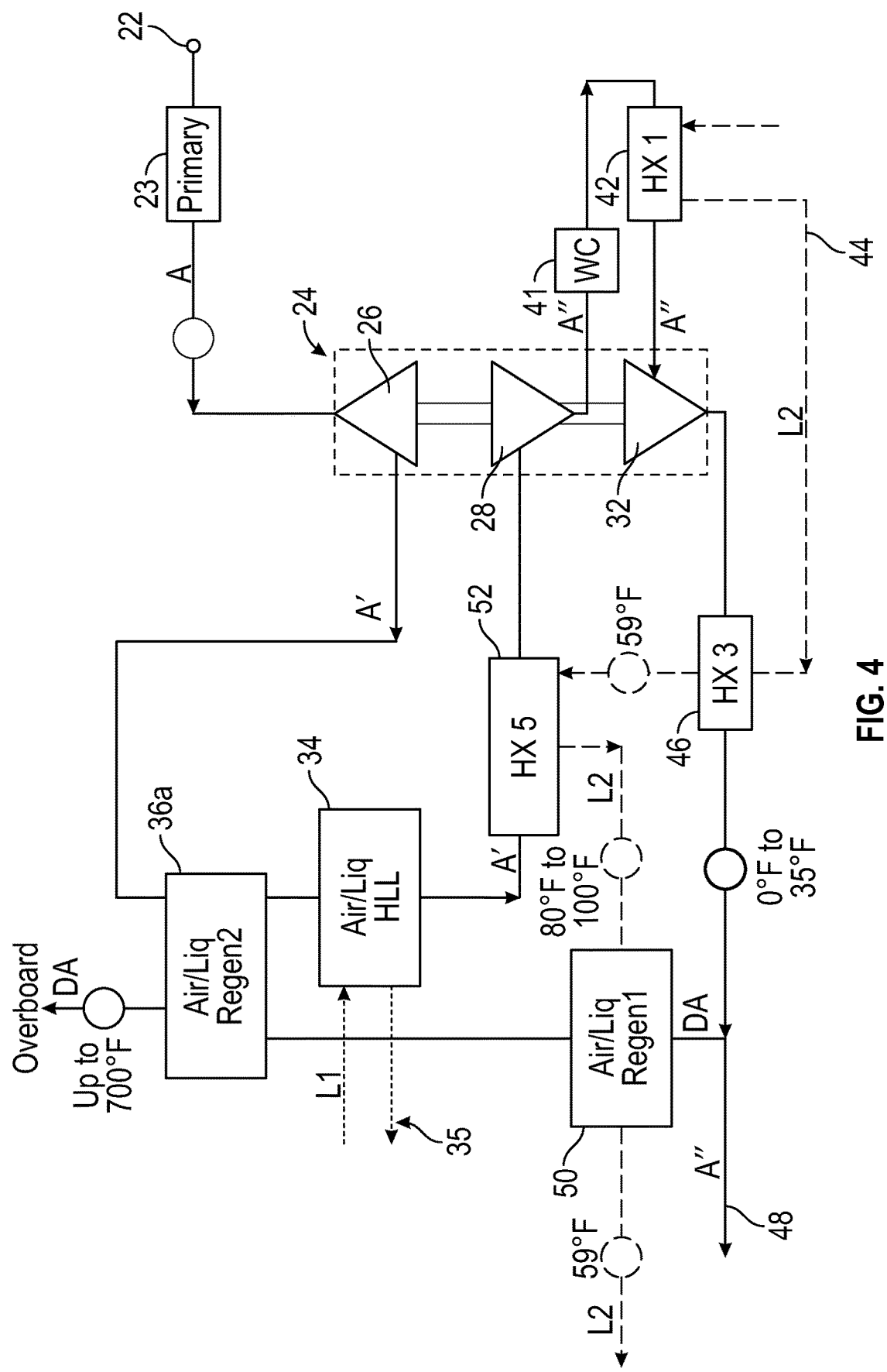
FIG. 4 is a schematic diagram of a portion of an environmental control system of an aircraft according to another embodiment.

With reference now to FIGS. 2-4, a portion of an ECS 20, similar to that shown in FIG. 1 is illustrated. However, in each of the various embodiments illustrated in FIGS. 2-4, the ECS 20 is configured to reduce, and in some embodiments minimize, the heat rejected from the compressed medium A' into the first liquid loop 35, such as at the first air-liquid heat exchanger 34 for example. In each of the non-limiting embodiments of an ECS 20 shown in FIGS. 2-4, the diverted medium DA is used to cool the first liquid L1 of the first liquid loop 35.

With reference now to FIG. 2, the regeneration heat exchanger 36 of the system of FIG. 1 has been eliminated. As shown, the ECS 20 includes at least one air-liquid regeneration heat exchanger 48 arranged within the first liquid loop 35. In an embodiment, a first air-liquid regeneration heat exchanger 48a is arranged upstream from the inlet of the first air-liquid heat exchanger 34 relative to the flow of the liquid L1 of the first liquid loop 35. Alternatively, or in addition, a second air-liquid regeneration heat exchanger 48b may be arranged downstream from the outlet of the first air-liquid heat exchanger 34 relative to the flow of the liquid L1 of the first liquid loop 35.

In the illustrated, non-limiting embodiment, the regeneration heat exchanger 36 has essentially been split into two portions (the first air-liquid regeneration heat exchanger 48a and the second air-liquid regeneration heat exchanger 48b), and repositioned within the first liquid loop 35 of the ECS 20. In such embodiments, the total volume of the air-liquid regenerations heat exchanger 48a, 48b, in combination, may be the same volume or smaller than the volume of the air-air regeneration heat exchanger 36 of the baseline system of FIG. 1.

Similar to the regeneration heat exchanger of FIG. 1, the first and second air-liquid regeneration heat exchangers 48a, 48b are configured to receive a flow of diverted medium DA provided from downstream of the outlet of the third air-liquid heat exchanger 46. In embodiments including both a first and second air-liquid regeneration heat exchanger 48a, 48b, the second air-liquid regeneration heat exchanger 48b is arranged downstream from the first air-liquid regeneration heat exchanger 48a relative to both the liquid L1 and the diverted medium DA.

Within the first air-liquid regeneration heat exchanger 48a, the liquid L1 is arranged in a heat transfer relationship with the diverted medium DA. Because the temperature of the liquid L1 is significantly warmer than the temperature of the diverted medium, the liquid L1 is cooled by the diverted medium DA within the first air-liquid regeneration heat exchanger 48a. In an embodiment, the temperature of the diverted medium DA upstream from the first air-liquid regeneration heat exchanger 48a is between about 0° F. and about 35° F. and the temperature of the diverted medium DA directly downstream from the first air-liquid regeneration heat exchanger 48a is between about 75° F. and about 125° F.

From the first air-liquid regeneration heat exchanger 48a, the liquid L1 is provided to the first air-liquid heat exchanger 34. Within the first air-liquid heat exchanger 34, the liquid L1 arranged in a heat transfer relationship with the compressed medium A'. The compressed medium A' may be cooled within the first air-liquid heat exchanger 34 to a temperature above freezing (32° F.). In an embodiment, the temperature of the compressed medium A' output from the first air-liquid heat exchanger 34 is between about 35° F. and about 50° F.

From the first air-liquid heat exchanger 34, the liquid L1 may be provided to the second air-liquid regeneration heat exchanger 48b. Within the second air-liquid regeneration heat exchanger 48b, the liquid L1 is cooled by the diverted medium DA. Accordingly, heat from the liquid L1 is transferred to the diverted medium DA and the resulting heated diverted medium DA may then be exhausted overboard or provided to another component of subsystem of the aircraft. In an embodiment, the temperature of the diverted medium DA downstream from the second air-liquid heat exchanger 48b is at least 150° F. and in some embodiments is up to or greater than 225° F. The remainder of the ECS 20 of FIG. 2 is configured to operate substantially identical to the system of FIG. 1.

In another embodiment of the ECS 20, illustrated in FIG. 3, the first liquid loop 35 includes the first air-liquid heat exchanger 34 and a single air-liquid regeneration heat exchanger 48. As shown, the air-liquid regeneration heat exchanger 48 may be arranged upstream from the inlet of the first air-liquid heat exchanger 34 relative to the flow of the liquid L1 of the first liquid loop 35. Further, the air-air regeneration heat exchanger 36a in the illustrated, non-limiting embodiment is repositioned to upstream of the air-liquid heat exchanger 34 relative to the flow of compressed medium A. The air-air regeneration heat exchanger 36a may also be arranged downstream from the air-liquid regeneration heat exchanger 48 relative to the flow of diverted medium DA.

In the non-limiting embodiment of FIG. 3, the regeneration heat exchanger 36 of the original system (FIG. 1) is split into two portions, the air-liquid regeneration heat exchanger 48, and the air-air regeneration heat exchanger 36a. Accordingly, one portion is arranged in the first liquid loop 35, upstream from the air-liquid heat exchanger 34 and another portion is arranged along the flow path of the compressed medium A' upstream from the first air-liquid heat exchanger 34. In such embodiments, the total volume of the air-liquid regeneration heat exchanger 48, and the air-air regeneration heat exchanger 36a in combination, may be the same volume or smaller than the volume of the air-air regeneration heat exchanger 36 of the baseline system of FIG. 1.

Accordingly, during operation of the ECS 20 of FIG. 3, diverted medium DA from downstream of the third air-liquid heat exchanger 46 is provided first to the air-liquid regeneration heat exchanger 48. Because the temperature of the liquid L1 is significantly warmer than the temperature of the diverted medium DA, the liquid L1 is cooled by the diverted medium DA within the air-liquid regeneration heat exchanger 48. In an embodiment, the temperature of the diverted medium DA upstream from the air-liquid regeneration heat exchanger 48 is between about 0° F. and about 35° F. and the temperature of the diverted medium DA directly downstream from the air-liquid regeneration heat exchanger 48 is between about 75° F. and about 125° F.

The diverted medium DA from the air-liquid heat exchanger and the compressed medium A' output from the compressor 26 are both provided to the air-air regeneration heat exchanger 36a. Within the air-air regeneration heat exchanger 36a, heat from the compressed medium A' is transferred to the cooler diverted medium DA. In an embodiment, the temperature of the diverted medium DA downstream from the air-air regeneration heat exchanger 36a is greater than about 125° F. and in some embodiment is up to about 700° F. The hot diverted medium DA is exhausted overboard, or may be delivered to another system onboard the aircraft. The cooled compressed medium A' output from the air-air regeneration heat exchanger 36a is then provided to the first air-liquid heat exchanger 34. Within the first air-liquid heat exchanger 34, the compressed medium A' is arranged in a heat transfer relationship with the liquid L1 output from the air-liquid regeneration heat exchanger 48. In an embodiment, the compressed medium A' at the first air-liquid heat exchanger 34 is further cooled by the cold liquid L1. The compressed medium A' may be cooled within the first air-liquid heat exchanger 34 to a temperature above freezing (32° F.). In an embodiment, the temperature output from the air-liquid heat exchanger 34 is between about 35° F. and about 50° F. The remainder of the ECS 20 of FIG. 3 is configured to operate substantially identical to the system of FIG. 1.

With reference now to FIG. 4, yet another embodiment of an ECS 20 is illustrated. As shown, first liquid loop 35 includes only the first air-liquid heat exchanger 34. However, an air-liquid regeneration heat exchanger 50 may be integrated into the second liquid loop 44, such as downstream from the third air-liquid heat exchanger 46 relative to the flow of the second liquid L2. The air-liquid regeneration heat exchanger 50 may also be arranged downstream from the third air-liquid heat exchanger 46 relative to the flow of expanded medium A". For example, the air-liquid regeneration heat exchanger 50 may be configured to receive the flow of diverted medium DA.

Further, similar to the embodiment of FIG. 3, the ECS 20 includes an air-air regeneration heat exchanger 36a positioned upstream from the first air-liquid heat exchanger 34 relative to the flow of compressed medium A. The air-air regeneration heat exchanger 36a may also be arranged downstream from the air-liquid regeneration heat exchanger 50 relative to the flow of diverted medium DA.

In an embodiment, the ECS 20 additionally includes an air-liquid heat exchanger 52 arranged downstream from the third air-liquid heat exchanger 46 and upstream from the air-liquid regeneration heat exchanger 50 relative to the flow of the second liquid L2 of the second liquid loop 44. The air-liquid heat exchanger 52 may also be disposed along the flow path of the compressed medium A', such as at a location downstream from at least one, and in some embodiments from both of the air-air-regeneration heat exchanger 36a and the first air-liquid heat exchanger 34. In an embodiment, the air-liquid heat exchanger 52 is positioned upstream from the turbine 28 relative to the flow of the compressed medium A'.

In the non-limiting embodiment of FIG. 4, the regeneration heat exchanger 36 of the original system (FIG. 1) is separated into two portions, the air-liquid heat exchanger 52, and the air-air regeneration heat exchanger 36a. Accordingly, one portion is arranged in the second liquid loop 44, downstream from the third air-liquid heat exchanger 46 and another portion is arranged along the flow path of the compressed medium A' upstream from the first air-liquid heat exchanger 34. In such embodiments, the total volume of the air-liquid heat exchanger 52, and the air-air regeneration heat exchanger 36a in combination, may be the same volume or smaller than the volume of the air-air regeneration heat exchanger 36 of the baseline system of FIG. 1.

During operation of the ECS 20 of FIG. 4, diverted medium DA from downstream of the third heat exchanger 46 is provided first to the air-liquid regeneration heat exchanger 50. Because the temperature of the liquid L2 is significantly warmer than the temperature of the diverted medium DA, the liquid L2 is cooled by the diverted medium DA within the air-liquid regeneration heat exchanger 50. In an embodiment, the temperature of the diverted medium DA upstream from the air-liquid regeneration heat exchanger 50 is between about 0° F. and about 35° F. and the temperature of the diverted medium DA directly downstream from the air-liquid regeneration heat exchanger 50 is between about 75° F. and about 125° F. Further, in an embodiment, the temperature of the liquid L2 upstream from the air-liquid regeneration heat exchanger 50 is between about 80° F. and about 100° F. and the temperature of the liquid L2 downstream from the air-liquid regeneration heat exchanger 50 is less than about 60° F., such as about 59° F. for example.

The diverted medium DA from the air-liquid heat exchanger 50 and the compressed medium A' output from the compressor 26 are both provided to the air-air regeneration heat exchanger 36a. Within the air-air regeneration heat exchanger 36a, heat from the hot compressed medium A' is transferred to the cooler diverted medium DA. In an embodiment, the temperature of the diverted medium DA downstream from the air-air regeneration heat exchanger 36a is greater than about 125° F., and in some embodiments is up to about 700° F. The resulting hot diverted medium DA is exhausted overboard, or may be delivered to another system onboard the aircraft. The cooled compressed medium A' output from the air-air regeneration heat exchanger 36a is then provided to the first air-liquid heat exchanger 34. Within the first air-liquid heat exchanger 34, the compressed medium A' is arranged in a heat transfer relationship with a cool liquid L1. Accordingly, the compressed medium A' is further cooled by the cold liquid L1 at the first air-liquid heat exchanger 34.

From the first air-liquid heat exchanger 34, the compressed medium A' is provided to the air-liquid heat exchanger 52. Within the air-liquid heat exchanger 52, the cool compressed medium A' is arranged in a heat transfer relationship with the second liquid L2, such as the second liquid L2 output from the third air-liquid heat exchanger 46 for example. In the air-liquid heat exchanger 52, the second liquid L2 is heated by the compressed medium A'. The compressed medium A' may be cooled within the air-liquid heat exchanger 52 to a temperature above freezing (32° F.). In an embodiment, the temperature output from the air-liquid heat exchanger 52 between about 35° F. and about 50° F.

In an embodiment, the temperature of the second liquid L2 provided to or directly upstream from the air-liquid heat exchanger 52 is less than about 60° F. and the temperature of the second liquid L2 downstream from the air-liquid heat exchanger 52 and upstream from the air-liquid regeneration heat exchanger 50 is between about 80° F. and about 100° F. In an embodiment, the temperature of the second liquid L2 directly upstream from the air-liquid heat exchanger 52 is equal to, or substantially equal to (such as within 1 or 2 degrees for example), the temperature of the second liquid L2 at a location downstream from the air-liquid regeneration heat exchanger 50. Accordingly, the additional heat that is absorbed by the second liquid L2 at the air-liquid heat exchanger 52 is then released to the diverted medium DA in the air-liquid regeneration heat exchanger 50.

By limiting the heat provided to the first liquid L1 of the first liquid loop 35, the thermodynamic efficiency of the ECS 20 is improved. The system 20 may maintain or even lower the temperature of the compressed medium A' provided to the turbine while maintaining or improving the cooling performance relative to an ECS having a single regeneration heat exchanger 36 located downstream from the first air-liquid heat exchanger 34.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
    an inlet configured to receive a medium;
    a compressing device fluidly connected to the inlet, the compressing device including a compressor operably coupled to a turbine, wherein an outlet of the compressor is fluidly connected to an inlet of the turbine such that the medium is provided to the compressor and the turbine in series;
    at least one air-liquid heat exchanger arranged in fluid communication with the outlet of the compressor and the inlet of the turbine of the compressing device, the at least one air-liquid heat exchanger also being connected to a liquid loop containing a liquid; and
    at least one air-liquid regeneration heat exchanger fluidly connected to the liquid loop at a location directly upstream from the at least one air-liquid heat exchanger, wherein a temperature of a liquid at an outlet of the air-liquid regeneration heat exchanger is less than the temperature of the liquid at an inlet of the air-liquid regeneration heat exchanger.

2. The environmental control system of claim 1, wherein the liquid of the liquid loop has a temperature between about 80° F. and about 130° F. at an inlet of the at least one air-liquid heat exchanger.

3. The environmental control system of claim 1, wherein the at least one air-liquid regeneration heat exchanger further comprises a first air-liquid regeneration heat exchanger and a second air-liquid regeneration heat exchanger, the second air-liquid regeneration heat exchanger being arranged downstream from the at least one air-liquid heat exchanger relative to a flow of the liquid.

4. The environmental control system of claim 1, further comprising an air-air regeneration heat exchanger, the air-air regeneration heat exchanger being positioned upstream from and fluidly coupled to the at least one air-liquid heat exchanger relative to a flow of the medium.

5. The environmental control system of claim 1, wherein the air-air regeneration heat exchanger is arranged downstream from and in fluid communication with an outlet of the at least one air-liquid regeneration heat exchanger relative to a flow of another medium.

6. The environmental control system of claim 5, wherein the flow of another medium is configured as a heat sink to cool the medium at a location downstream from the outlet of the compressor and upstream from the inlet of the turbine.

7. The environmental control system of claim 1, further comprising an outlet, wherein a conditioned form of the medium is provided to the outlet and a portion of the conditioned form of the medium is used as a flow of air within the at least one air-liquid regeneration heat exchanger.

8. The environmental control system of claim 7, wherein the portion of the conditioned form of the medium has a temperature between 0° F. and 35° F. at the at least one air-liquid regeneration heat exchanger.

9. The environmental control system of claim 7, wherein the portion of the conditioned form of the medium has a temperature equal to or greater than 125° F. at the at least one air-liquid regeneration heat exchanger.

10. The environmental control system of claim 9, further comprising:
    a second air-liquid heat exchanger arranged downstream from and in fluid communication with an outlet of the turbine;
    wherein a second liquid from another liquid loop is arranged at in a heat transfer relationship with the medium at the second air-liquid heat exchanger.

* * * * *